E. DAMME.
SHOCK ABSORBER.
APPLICATION FILED DEC. 3, 1917.
1,274,515. Patented Aug. 6, 1918.
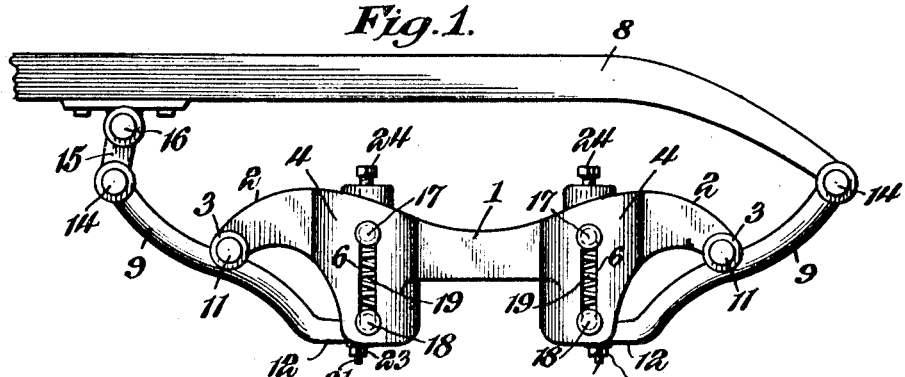
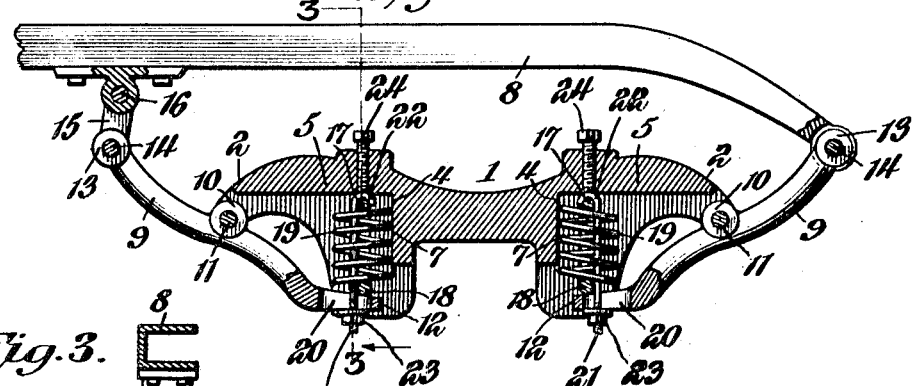
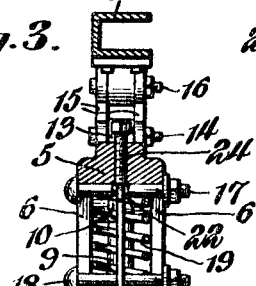
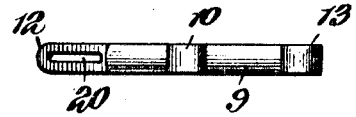
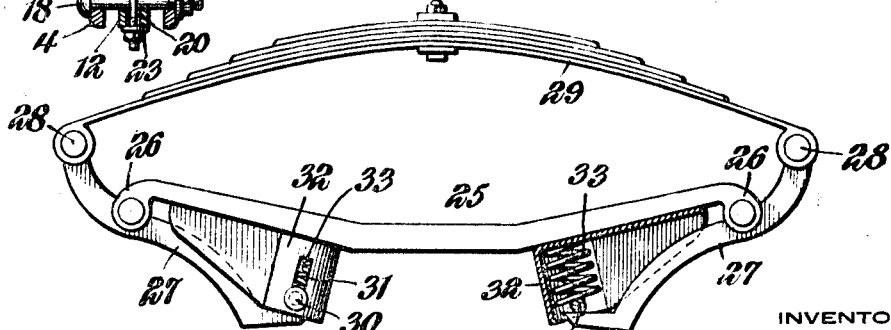
WITNESSES
INVENTOR
Edward Damme,
BY
ATTORNEY ced by this application filed by Leters Patent. Patented Aug. 6, 1918.

UNITED STATES PATENT OFFICE.

EDWARD DAMME, OF BATTLE CREEK, MICHIGAN.

SHOCK-ABSORBER.

1,274,515. Specification of Letters Patent. Patented Aug. 6, 1918.

Continuation in part of application Serial No. 150,714, filed February 24, 1917. This application filed December 3, 1917. Serial No. 205,085.

*To all whom it may concern:*

Be it known that I, EDWARD DAMME, a citizen of the United States, residing at Battle Creek, in the county of Calhoun and State of Michigan, have invented a new and useful Shock-Absorber, of which the following is a specification.

This invention relates to shock absorbers for vehicles, such as carriages and motor vehicles, and is a continuation in part of my application for shock absorber, filed Feb. 24, 1917, Serial No. 150,714.

The object is to provide a device of this character, in which resilient means are interposed in the connection between the axle and the body of the vehicle, which means may be used in conjunction with the ordinary semi-elliptical leaf spring commonly employed in vehicle construction, or in lieu thereof, thereby preventing the tossing of the vehicle body and the jarring of the passengers or occupants of the vehicle, while traveling over rough or uneven roads.

Another object of the invention is to provide an attachment which can be easily applied to any semi-elliptical spring, or to any standard vehicle now in use, without changes, or with such slight modifications as would be within the skill of any ordinary mechanic.

A full and complete understanding of the invention will be obtained from a consideration of the following detailed description, taken in connection with the accompanying drawing forming part of this specification; it being understood that while the drawing shows a practical form of the invention, the latter is not confined to strict conformity therewith, but may be changed or modified, so long as such changes or modifications mark no material departure from the salient features of the invention, as specifically pointed out in the claims appended hereto.

In the drawing, in which like reference numerals designate corresponding parts in each of the several figures:—

Figure 1 is a side elevation of the improved shock absorber shown applied to a frame member of an automobile;

Fig. 2 is a view similar to Fig. 1 but showing parts in section;

Fig. 3 is a transverse section on the line 3—3 of Fig. 2;

Fig. 4 is a plan view of one of the levers, forming part of the invention;

Fig. 5 is an elevation, partly in section, of a somewhat modified form of the invention and shown applied to an ordinary vehicle spring, this form being a duplicate of the disclosure in my former application.

The device comprises a longitudinally disposed member 1 made from a suitable metal cast into proper shape to form a cross member adapted to rest at its center upon and be secured to the front or rear axle of the vehicle (not shown). Four of the devices will be used on the motor vehicle, two at each side.

The cross bar 1 has its ends preferably rising somewhat from the body thereof, as indicated at 2, and terminating in eyes 3 for a purpose to be described. At intermediate points between the center of the cross bar 1 and the terminal eyes 3, housings 4 are provided whose axes extend substantially perpendicular to the longitudinal axis of the cross bar 1 and are preferably formed integral with said bar by being cast therewith.

The housings 4 are closed at their upper ends by walls 5 extending in opposite directions from the central body portion of the cross bar 1 and terminating substantially over the terminal eyes 3. The side walls of the housings 4 are substantially parallel and extend from the cross bar 1 on the side thereof opposite to the walls 5, and are provided with opposite longitudinally disposed slots 6 extending throughout the major portion of the lengths of said housings 4, and the latter are further provided with inner, opposed walls 7, as clearly illustrated in Fig. 2 of the drawings.

The cross bar 1 is arranged, as illustrated in Figs. 1 to 4 inclusive, parallel with and directly beneath the member 8 of an ordinary automobile frame structure, and is pivotally connected therewith through the medium of levers 9 in the manner to be described.

The levers 9 are formed of suitable metal sufficiently strong to withstand the strain to which they are subjected, and are preferably in the form of compound curves having formed at intermediate points thereon suitable eyes 10, which are pivoted to the aforesaid terminal eyes 3 of the cross bar 1 through the medium of bolts 11.

The lower, inner ends 12 of the levers 9 are thus directed toward each other, and normally extend into the lower ends of the housings 4 and between the side walls thereof. The upper ends of the levers 9 are each provided with suitable eyes 13 for the reception of bolts 14, which pivotally connect the same to the frame member 8. One lever 9 constituting the front lever is directly pivoted to the said frame member 8, while the opposite lever 9, constituting the rear lever, is preferably connected to the lower ends of a link or links 15, which in turn are suitably pivoted at their upper ends to the underside of the frame member 8, as indicated at 16, for a purpose to be explained.

Upper and lower transversely disposed pins or bars 17 and 18 respectively traverse the longitudinal slots 6 in the opposite side walls of the housings 4. The lower transverse pins 18 normally rest upon the inwardly directed lower ends 12 of the levers 9 and are adapted to be actuated thereby.

Expansion springs 19 are located within the housings 4 and between the upper and lower transverse pins 17 and 18, and have a normal tendency to force the same apart, thus causing the lower inner ends of the levers 9 to be forced away from the longitudinal axis of the cross bar 1.

The inwardly directed ends 12 of the levers 9 are provided with longitudinal slots 20. The latter are traversed by rods 21, which pass through the coils of the expansion springs 19, and are provided at their upper ends with hooks 22 adapted to engage the upper pins 17, and are threaded at their opposite ends for the reception of nuts 23 having washers interposed between them and the lower faces of the terminals 12. The rods 21, by traversing the coiled springs 19 and engaging the upper pins 17, prevent the said springs from displacement out of the housings 4, and it will be seen that by adjusting the nuts 23 upon the said rods, the tension upon the said springs may be varied at will. The upper and lower pins constitute movable abutments, the upper pins being held stationary while the lower pins move and vice versa.

The top walls 5 of the housings 4 are bored and threaded for the reception of adjusting screws 24 located in alinement with the vertically disposed slots 6, and consequently in a position to bear upon the upper transverse pins 17, by which additional means are provided for increasing or decreasing the expansive force of the springs 19.

By the provision of the rods 21 having connection with the top abutments 17, and the lower ends of the levers 9 bearing beneath the movable abutments 18, it will be seen that a double action upon the springs is secured by reason of the fact that, when the lower ends of the levers 9 approach the walls 5, the springs 19 will be compressed through the movable abutments 18 at their lower ends and the top abutments 17 at their upper ends, the latter either bearing against the set screws 24, or the upper terminals of the slots 6. On the other hand, any downward movement of the lower ends 12 of the levers will exert a pulling action through the rods 21 to the upper pins 17, which then become the movable abutments, while the lower pins 18, then resting in the adjacent ends of the slots 6, become the top abutments, so that the springs 19 are again compressed, thus serving to cushion the device upon either movement of the levers 9.

In Fig. 5 of the drawings, there is illustrated a somewhat simplified form of the invention, which constituted the subject matter of the application previously referred to. In this figure, the member 25, which is the equivalent of the cross bar 1, has its terminals slightly inclined and provided with eyes 26 to which are pivoted the levers 27 having their upper or outer terminals pivotally connected as at 28 to an ordinary semi-elliptical vehicle spring 29, and their lower ends bearing upon pins 30 constituting movable abutments, which traverse slots 31 formed in housings 32, and having coiled expansion springs 33 interposed between the said pins 30, and the upper closed ends of the housings 32. In this last-mentioned form of the device, the link 15 is dispensed with, and the levers, as stated, are directly connected to the ends of the spring 29. This is made possible by reason of the fact that when the spring 29 is subjected to a load and caused to straighten out, the distance between the terminal pivots 28 is increased, which compensates for the arcuate movement of the upper ends of the levers 27. In the first described form of the invention, however, since the frame 8 is of a rigid nature, it will readily be seen that the provision of the links 15 is necessary in order to permit of the said arcuate movement of the upper ends of the levers 9.

From the foregoing, it will be seen that the invention provides a construction which is simple, and comprises a minimum number of parts which cannot be easily disarranged or broken, and in which friction is reduced to a minimum. The invention is applicable to leaf springs or an equivalent thereof, which are arranged either longitudinally of the vehicle or transversely thereof, and by arranging the coiled springs in the manner shown and described, the levers exert a thrust thereon in a direction substantially coincident with their axes, and thereby prevent the distortion of the same.

While I have shown and described one embodiment of my invention, it is to be understood that I do not desire to be limited to the details of construction herein shown and described, for obvious modifications will be apparent to one skilled in the art.

The shock absorber may be secured either to the underside of the axle or upon the same, and in either case clips will be used to fasten the cross bar at its center to the axle.

What is claimed is:—

1. A shock absorber comprising relatively movable, superposed members, substantially vertically disposed housings carried by one of the members, substantially vertically disposed coiled springs mounted within said housings, said housings being open at their lower ends, and levers, each pivoted at an intermediate point to one of the ends of that member having the housings thereon, for rocking movement, and pivotally connected at one end to the other member, and active at the other end against one of the coiled springs, the last mentioned end working within the lower end of the adjacent housing.

2. A shock absorber comprising relatively movable upper and lower members, the lower member having substantially vertically disposed housings and having spaced substantially parallel sides and open lower ends, springs mounted within the housings, and rocking levers pivoted intermediate their ends to the ends of the member having the housings and also pivotally connected to the upper member, the levers being engaged at one of their ends in the open lower ends between the sides of the housings and working against the spring therein, the spacing of the housings enabling the lower member to be fastened to an axle.

3. The combination with a member adapted to be attached to the body of a vehicle, of a cross bar, said parts being in superposed relation, substantially vertically disposed housings mounted upon said cross bar and having their lower ends open, substantially vertically disposed coiled springs mounted within said housings, movable abutments retaining said coiled springs within the housings, and levers pivoted to said cross bar, connected to the said first-mentioned member and having their inner ends inserted within the open ends of the housings and engaging said movable abutments.

4. The combination with a member adapted to be attached to the body of a vehicle, of a cross bar, said member and said cross bar being arranged in superposed relation, substantially vertically disposed housings fixed to said cross bar at the opposite ends thereof and spaced apart and open at their lower ends, substantially vertically disposed coiled springs arranged in said housings, said housings being provided with vertically extending slots, slidable and rotatable pins mounted in said slots and constituting movable abutments and retaining said springs within the housings, and levers pivoted to said cross bar, attached at their outer ends to said member, and engaging said pins at their inner ends which work within the lower open ends of the housings.

5. The combination with a member adapted to be attached to the body of a vehicle, of a cross bar, said member and said cross bar being arranged in superposed relation, substantially vertically disposed housings mounted upon said cross bar at the opposite ends thereof and having spaced sides and open at the bottom, substantially vertically disposed coiled springs interposed within said housings, movable abutments for retaining said coiled springs within the housings, and levers pivoted to said cross bar intermediate their ends and connected at their outer ends to said member, the inner ends of said levers extending into the open bottoms of the housings and riding between the sides of said housings and engaging said movable abutments to compress the coiled springs.

6. The combination with a member adapted to be attached to the body of a vehicle, of a cross bar, said member and said cross bar being arranged in vertical alinement, substantially vertically disposed housings extending from said cross bar and having spaced sides and open at the bottom, coiled springs mounted within said housings, said coiled springs being substantially vertical, the sides of said housings being provided with vertically extending slots, pins slidably and rotatably mounted within said slots and constituting movable abutments retaining the coiled springs in place, and levers pivoted intermediate their ends to the ends of said cross bar, the inner arms of said levers extending into the open bottoms of the housings and riding between said spaced sides and having their inner ends engaging said pins, the outer arms of said levers being pivotally connected to the first mentioned member, whereby as the said member approaches the said cross bar the coiled springs will be compressed.

7. The combination with a member adapted to be attached to the body of a vehicle, of a cross bar, said member and said cross bar being in superposed relation, substantially vertically disposed housings fixed to the cross bar and extending therefrom and having spaced sides and open lower ends, rocking levers pivoted intermediate their ends to the ends of the cross bar and also pivoted to the said member, the levers having their inner ends inserted in the open ends and working between the sides of the housings and working against the springs therein, and slidable means mounted in the housings and interposed between the springs therein and the end portions of the levers.

8. The combination with a vehicle frame member, of a cross bar arranged in longitudinal and vertical alinement therewith and in spaced relation beneath the same, vertically disposed housings carried by the cross bar, said housings being open at their lower ends and closed at their upper ends and having vertical slots in their sides, levers intermediately pivoted to the ends of the cross bar beyond the housings and having their outer ends pivotally connected to the frame member, and their inner ends extending into the housings, pins traversing the upper portions of the said slots and constituting top movable abutments, screws carried by the closed ends of the housings and adapted to bear on said pins for adjusting the same, other pins traversing the lower portions of the slots and bearing on the inwardly directed ends of the levers and constituting bottom movable abutments, and coiled springs mounted in the housings between the upper and lower pins and having a normal tendency to separate the same.

9. The combination with a vehicle frame member, of a cross bar arranged in vertical and longitudinal alinement therewith, vertically disposed housings provided on the cross bar adjacent to its ends, and having vertical slots in their walls, levers intermediately pivoted to the ends of the cross bar and pivotally connected at their outer ends, one lever to the end of the frame member, and the other lever having a link connection to an intermediate point of said member, said levers having their inner ends extending into the housings and provided with longitudinal slots, upper adjustable pins traversing the slots in the housings, lower pins also traversing said slots and bearing upon the lower ends of the levers, coiled expansion springs mounted in the housings between the upper and lower pins, and rods hooked to the upper pins and passing through the springs and through the slots in the ends of the levers, and nuts threaded on the lower ends of the rods and engaging the levers for causing a double action on the springs.

10. A shock absorber comprising relatively movable superposed members, housings carried by one of the members, coiled springs mounted within said housings, and levers each pivoted at an intermediate point to one of the ends of that member having the housings thereon, and pivotally connected at one end to the other member, and active at the other end against one of the coiled springs, the last-mentioned end working within the adjacent housing, and means connecting the housed ends of the levers with the springs whereby both springs are compressed in the same direction by both motions of the levers.

11. The combination with a vehicle frame member, of a cross bar arranged in longitudinal and vertical alinement therewith and in spaced relation beneath the same, substantially vertically disposed housings carried by the cross bar in spaced relation to each other, said housings being open at their lower ends and closed at their upper ends and having vertical slots in their sides, levers intermediately pivoted to the ends of the cross bar beyond the housings and having their ends pivotally connected to the frame member and their inner ends extending into the lower open ends of the housings, pins traversing the upper portions of said slots and constituting top movable abutments, screws carried by the closed ends of the housings and adapted to bear on said pins for adjusting the same, other pins traversing the lower portions of the slots, and bearing on the inwardly directed ends of the levers and constituting bottom movable abutments, coiled springs mounted in the housings, between the upper and lower pins, and having a normal tendency to separate the same, and rods hooked to the upper pins and passing through the springs and connected to the inner ends of said levers, whereby the spring is compressed in both of the up and down movements of the levers.

12. The combination with a vehicle frame member, of a cross bar arranged in vertical and longitudinal alinement therewith, substantially vertically disposed housings provided on the cross bar adjacent to its ends and having vertical slots in their walls, levers intermediately pivoted to the ends of the cross bar and pivotally connected at their outer ends to the frame member, said levers having their inner ends extending into the housings, upper pins traversing the slots in the housings, lower pins also traversing said slots and bearing upon the lower ends of the levers, coiled springs mounted in the housings between the upper and lower pins, rods hooked to the upper pins and passing through the springs and through the ends of the levers, and means connecting the lower ends of the rods to the levers whereby the springs are compressed in both movements of the levers.

In testimony that I claim the foregoing as my own I have hereto affixed my signature in the presence of two witnesses.

EDWARD DAMME.

Witnesses:
O. A. BUTTERFIELD,
W. B. GIBSON.